(12) United States Patent
Davis et al.

(10) Patent No.: US 9,600,151 B2
(45) Date of Patent: Mar. 21, 2017

(54) INTERACTIVE DESIGN VARIATIONS INTERFACE

(71) Applicant: AUTODESK, INC., San Rafael, CA (US)

(72) Inventors: Mark Thomas Davis, Mill Valley, CA (US); Malte Tinnus, Berkeley, CA (US); Jeff Kowalski, Berkeley, CA (US); Jose Madeira De Freitas Garcia, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 231 days.

(21) Appl. No.: 13/891,011

(22) Filed: May 9, 2013

(65) Prior Publication Data

US 2014/0337779 A1 Nov. 13, 2014

(51) Int. Cl.
*G06F 3/048* (2013.01)
*G06F 3/0484* (2013.01)
*G06F 17/50* (2006.01)

(52) U.S. Cl.
CPC ............ *G06F 3/0484* (2013.01); *G06F 17/50* (2013.01); *G06F 17/5086* (2013.01)

(58) Field of Classification Search
CPC ................. G06F 3/048; G06F 3/04847; G06F 17/50–17/5095; G06F 2217/06
See application file for complete search history.

(56) References Cited

U.S. PATENT DOCUMENTS

2010/0128061 A1* 5/2010 Kowalski et al. ............ 345/619
2010/0201692 A1* 8/2010 Niles et al. ............. G06T 13/20
345/473

* cited by examiner

*Primary Examiner* — Claudia Dragoescu
(74) *Attorney, Agent, or Firm* — Artegis Law Group, LLP

(57) ABSTRACT

One embodiment of the present invention sets forth a technique for generating design variations. The technique involves identifying a first design variable and a second design variable associated with a first design. The technique further involves generating a first plurality of design variations based on the first design. Each design variation is generated by varying at least one of the first design variable and the second design variable. Finally, the technique involves causing the first plurality of design variations to be displayed to a user.

23 Claims, 15 Drawing Sheets
(4 of 15 Drawing Sheet(s) Filed in Color)

INTERACTIVE DESIGN VARIATIONS INTERFACE

BACKGROUND OF THE INVENTION

Field of the Invention

The present invention generally relates to computer software and, more specifically, to an interactive design variations interface.

Description of the Related Art

A wide variety of software applications are currently available to end-users, including computer-aided design (CAD) applications, three-dimensional (3D) modeling applications, simulation and optimization applications, and rendering applications, among others. Many of these software applications allow an end-user to interact with the software application via a graphical end-user interface (GUI). Conventional GUIs often provide the end-user with access to a set of tools that can be used to perform various operations within a workspace generated by the software application. For example, a 3D modeling and rendering application could provide a set of tools that could be used to generate images having different lighting conditions, object properties, etc. In another example, an architecture, engineering, and construction (AEC) application could provide a set of tools that could be used to prepare and optimize engineering designs. Each tool in these sets of tools may include a number of variables that the end-user could specify in order to modify generated images and engineering designs.

Despite advances in enabling end-users to more easily operate complex applications, learning how to use such applications can still be problematic. More complex applications, such as the 3D modeling and AEC applications described above, often include thousands of variables that can be modified by the end-user to generate images and/or optimize designs. In addition to having to keep track of such a large number of variables, predicting how changing or tweaking any one variable associated with a complex design would impact a rendered image or design objective is usually quite difficult. Consequently, generating a design of acceptable quality by varying the different application variables may require hundreds or thousands of design and rendering iterations, where each iteration requires significant time to change the relevant variable(s) and render the associated image (e.g., minutes or hours per iteration). Moreover, less experienced users may not understand how modifying various application variables affects image quality or a particular design objective. Such users, therefore, may not be able to generate quality designs regardless of the number of design and rendering iterations performed.

As the foregoing illustrates, there is a need in the art for a more effective way to enable application end-users to generate higher-quality designs.

SUMMARY OF THE INVENTION

One embodiment of the present invention sets forth a method for generating design variations. The method involves identifying a first design variable and a second design variable associated with a first design and generating a first plurality of design variations based on the first design. Each design variation is generated by varying at least one of the first design variable and the second design variable. Finally, the method involves causing the first plurality of design variations to be displayed to a user.

Further embodiments provide a non-transitory computer-readable medium and a computing device to carry out at least the method set forth above.

Advantageously, the disclosed technique allows a user of an application to view multiple design variations generated by modifying one or more design variables. The user can then select between the design variations and, if so desired, cause additional design variations to be generated by further modifying a particular design variable or modifying a new design variable. The disclosed technique, among other things, enables users to more efficiently generate high-quality designs and meet design objectives with little or no prior knowledge of the relevant application variables and commands.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided to the Patent and Trademark Office upon request and payment of the necessary fee.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
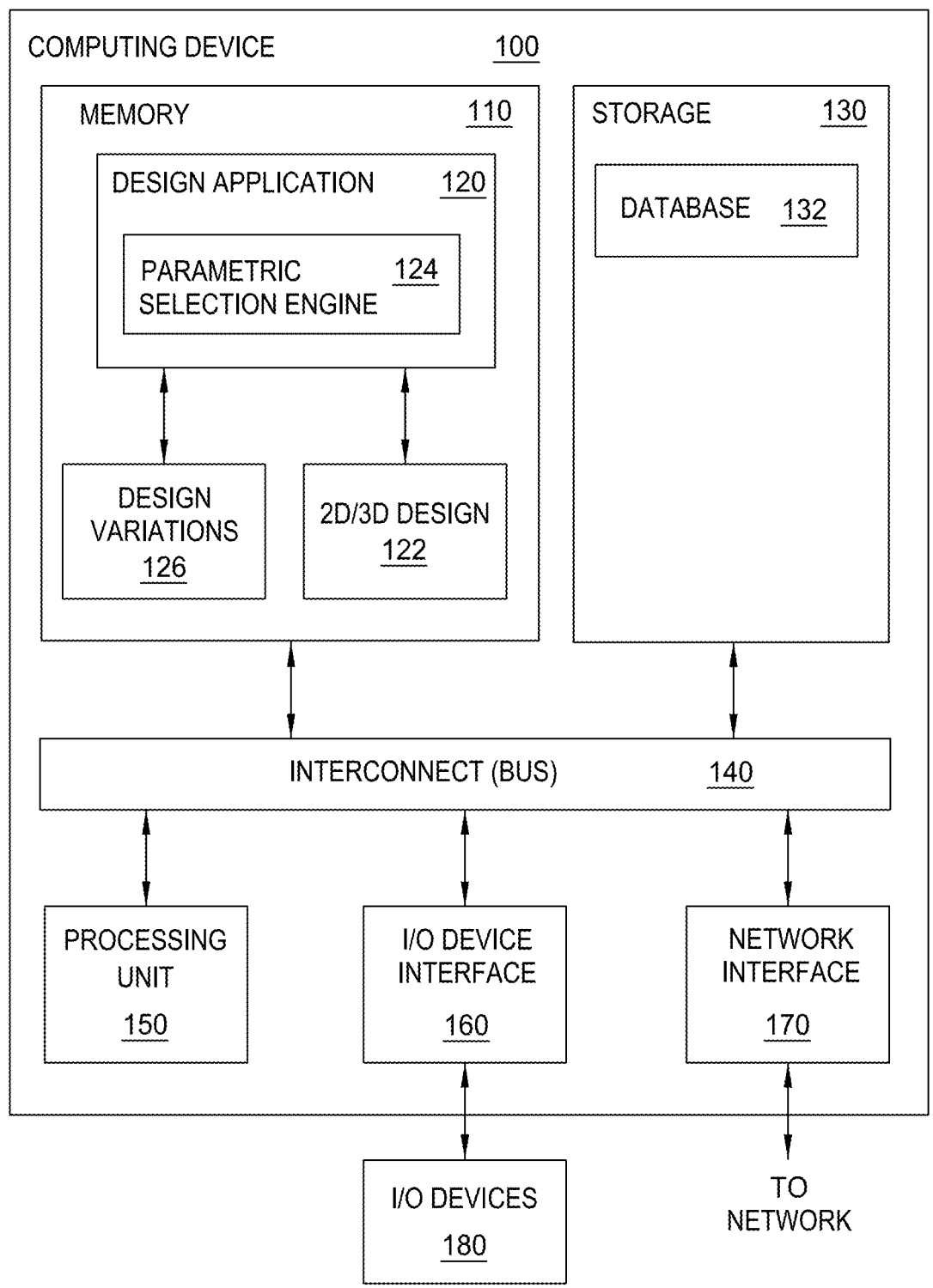
FIG. 1 illustrates a system configured to implement one or more aspects of the present invention.

FIG. 1 illustrates a computing device 100 configured to implement one or more aspects of the present invention. As shown, computing device 100 includes an interconnect (bus) 140 that connects a processing unit 150, an input/output (I/O) device interface 160 coupled to input/output (I/O) devices 180, a memory 110, a storage 130, and a network interface 170. Processing unit 150 may be a central processing unit (CPU), a graphics processing unit (GPU), or a combination of different processing units, such as a CPU configured to operate in conjunction with a GPU. In general, processing unit 150 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 180 may include devices capable of receiving input, such as a keyboard, a mouse, a video camera, a three-dimensional (3D) scanner, and so forth, as well as devices capable of providing output, such as a display device, a speaker, and so forth. Additionally, I/O devices 180 may include devices capable of both receiving input and providing output, such as a touchscreen, a universal serial bus (USB) port, and so forth. I/O devices 180 may be configured to receive various types of input from an end-user of computing device 100, and to also provide various types of output to the end-user of computing device 100.

Memory 110 may include a random access memory (RAM) module, a flash memory unit, or any other type of memory unit or combination thereof. Processing unit 150, I/O device interface 160, and network interface 170 are configured to read data from and write data to memory 110. Storage 130 may be a disk drive storage device. Although shown as a single unit, storage 130 may be a combination of fixed and/or removable storage devices, such as fixed disc drives, removable memory cards, or optical storage, network attached storage (NAS), or a storage area-network (SAN).

As also shown, memory 110 includes a two-dimensional and/or three-dimensional (2D/3D) design 122, a design application 120 that includes a parametric selection engine 124, and generated design variations 126. The 2D/3D design 122 may be any technically feasible type of design or mathematical model, including a polygonal mesh, a point cloud, a wireframe model, a manifold, and so forth. The design application 120 is a software application that may be executed by the processing unit 150. The design application 120 is configured to generate and/or modify the 2D/3D design 122. The design application 120 also may be configured to generate a graphical user interface (GUI) that provides to an end-user various tools for editing the 2D/3D design 122. The design application 120 is configured to generate a 2D rendering of the 2D/3D design 122 and display that rendering within a viewport included in the display space of the GUI. For example, the design application 120 may create the 2D rendering from the viewpoint of a virtual camera positioned within a 3D coordinate space.

As described above, the computing elements shown in computing device 100 may be a virtual computing instance executing within a computing cloud. Thus, design application 120 and/or parametric selection engine 124 computations (e.g., design variation generation/rendering, full-quality renderings, etc.) may be performed using a processing unit 150 (e.g., CPU and/or GPU) that is local to the user and/or such computations may be performed with a computing cloud. Further, the degree to which computations are distributed between local computing resources and cloud computing resources may be determined by the design application 120 and/or parametric selection engine 124 based on the scope of the application task(s), the local/cloud processing loads, and/or based on user choice. For example, the design application 120 and/or parametric selection engine 124 may recommend and provide feedback to the user whether a local computing scheme, a cloud computing scheme, or a combined local/cloud computing scheme is most time efficient, cost efficient, etc. The user may then select a desired computing scheme.

Although FIG. 1 shows the parametric selection engine 124 as a separate software module, it is also contemplated that the parametric selection engine 124 may be integrated into the design application 120 or offered as a software add-on or plug-in for the design application 120. When configured as a separate software module, the parametric selection engine 124 may be capable of generated design variations using a variety of different software applications. Further, although FIG. 1 illustrates the 2D/3D design(s) 122, generated design variations 126, and database 132 as being stored in specific locations in the computing device 100, each of these data structures may be stored in any type of memory or storage included in, or in communication with, the computing device 100.

The end-user may perform edit operations in order to modify the 2D/3D design 122 via tools provided by the GUI, and may also perform operations related to rendering (e.g., viewpoint and lighting position operations) in order to modify 2D renderings generated by the design application 120. For example, the end-user could change the dimensions of a 3D model via a tool provided by the GUI. Then, the end-user could manipulate a camera position to render the 3D model from various viewpoints.

The parametric selection engine 124 is configured to modify a 2D/3D design 122 to generate one or more design variations. The design variations may be generated by varying one or more design variables associated with the 2D/3D design. Each design variation may then be rendered and displayed to the end-user. For example, a low-resolution and/or low-fidelity rendering (e.g., a preview or approximated rendering) of each design variation may be generated and displayed to the end-user. In various embodiments, the parametric selection engine 124 may then receive a design variation selection from the end-user, a command from the end-user to increment one or more of the design variables, and/or a command to increase or decrease the number of design variations generated and displayed.

In response to the user input, the parametric selection engine 124 may further modify the 2D/3D design 122 to generate, render, and display additional design variations for the end-user. Additionally, the user input may include a selection of a design variation for which the design application 120 is to generate a high-quality rendering. The generated design variations 126 (e.g., modified 2D/3D designs 122 and/or 2D renderings of the 2D/3D designs 122) may be stored in the memory 110. The parametric selection engine 124 may be further configured to calculate one or more design attributes associated with one or more of the design variations. Design attributes may include, without limitation, material properties, performance characteristics, constructability, and/or costs associated with the 2D/3D design 122. The generated design variations 126 and optional design attributes may be displayed to the user in a variety of ways, including the grid configuration shown in FIG. 2, discussed below.

In addition, the parametric selection engine 124 may modify a 2D/3D design 122 based on design variables stored in a database 132. The database 132 may include different design objectives, each of which may be associated with one or more design variables. The design variables in the database 132 may include variables that have been specified by the user, previously used by the user, and/or generated by the parametric selection engine 124 or design application 120. For example, a 'dimensions' design objective may include design variables such as length, width, height, volume, surface area, and the like. In a rendering application, a 'viewpoint' design objective may include design variables such as rotate camera, pan camera, and the like. In a manufacturing or AEC application, a 'flow time' design objective (e.g., a flow time associated with injection molding) may include design variables such as injection temperature, injection pressure, injection point location, material viscosity, and the like. Additional exemplary design objectives and design variables are discussed below.

Figure 2A:
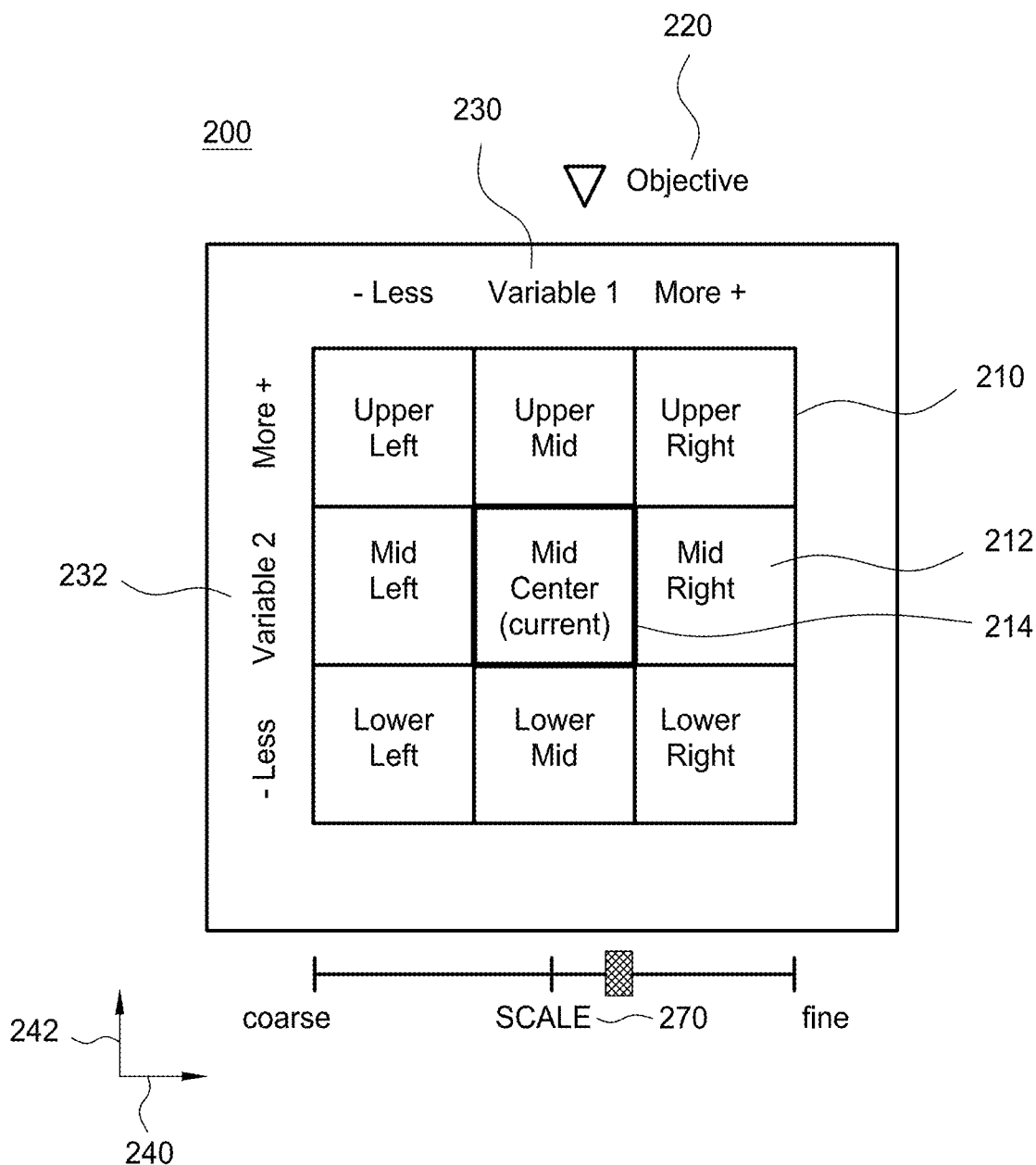
FIG. 2A illustrates an interface for displaying design variations generated by the parametric selection engine of FIG. 1, according to one embodiment of the present invention.

FIG. 2A illustrates an interface 200 for displaying design variations generated by the parametric selection engine 124 of FIG. 1, according to one embodiment of the present invention. As shown, the interface 200 includes a grid 210, a design objective 220, design variables 230, 232, and a scale selector 270. The grid 210 includes a plurality of design variations 212. Design variations 212 generated by the parametric selection engine 124 may be displayed in the grid 210 according to the value(s) assigned to the one or more design variables on which the design variations 212 are based.

As also shown, design variations 212 generated by varying design variables 230, 232 may be arranged such that the value of a first design variable 230 associated with each design variation 212 varies along a first grid axis 240, and the value of a second design variable 232 associated with each design variation 212 varies along a second grid axis 242. For example, in FIG. 2A, the value of the first design variable 230 associated with the Upper Left design variation 212 may be less than the value of the first design variable 230 associated with the Upper Mid design variation 212. In addition, the value of the first design variable 230 associated with the Upper Right design variation 212 may be greater than the value of the first design variable 230 associated with the Upper Mid design variation 212. Further, the value of the first design variable 230, at any point on the first grid axis 240, may be substantially constant along the second grid axis 242, and the value of the second design variable 232, at any point on the second grid axis 242, may be substantially constant along the first grid axis 240. For example, the values of the second design variable 230 associated with the Upper Left, Upper Mid, and Upper Right design variations 212 may be identical or substantially the same. In addition, the values of the first design variable 230 associated with the Upper Left, Mid Left, and Lower Left design variations 212 may be identical or substantially the same. Accordingly, design variations 212 may be displayed in a grid 210 in a manner that enables a user to efficiently determine which design variables are being modified as well as how the design variables are being modified.

The interface 200 may further display a current design 214. In one embodiment, the current design 214 may represent a 2D/3D design 122 on which the design variations 212 are based. For example, design variations 212 generated by the parametric selection engine 124 (e.g., based on a 2D/3D design 122 specified by the user) may be displayed to the user such that the user can view the current design 214 (e.g., a rendering based on the 2D/3D design 122) and also view variations of the current design 214. In the same or different embodiments, the current design 214 may represent a design variation 212 that was recently selected by the user. For example, after the design variations 212 are displayed to the user, the user may select a design variation 212 (e.g., a preferred design variation), and the selected design variation 212 may be designated as the current design 214. Additional design variations 212 may then be generated based on the current design 214.

The process of reviewing and selecting design variations 212 may enable a user to efficiently modify and refine a 2D/3D design 122. As described above, once a user selects a design variation 212, the design variation 212 may be designated as the current design 214 and/or additional design variations 212 may be generated by the parametric selection engine 124 (e.g., based on the current design 214). Additionally, once a design variation 212 is selected by the user, one or more design variations 212 may change positions in the grid 210. For example, selection of the Mid Right design variation 212 may cause the interface 200 to shift the positions of the Mid Left, Mid Center, and Mid Right design variations 212 such that the design variation 212 previously located in the Mid Right position is located in the Mid Center position. During this transition, the design variation 212 located in the Mid Left position may be shifted out of the grid 210 and no longer displayed to the user. Further, an additional design variation 212 may be displayed in the Mid Right position of the grid 210. The value of the first design variable 230 on which this additional design variation 212 is based may be higher than the value on which the design variable 212 previously located in the Mid Right position was based.

In another embodiment, selection of the Mid Right design variation 212 may cause the interface 200 to shift the position of multiple rows of design variations 212 (e.g., all design variations 212). During such a transition, the design variations 212 previously located in the Upper Left, Mid Left, and Lower Left positions may be shifted out of the grid 210 and no longer displayed to the user. Further, additional design variations 212 may be displayed in the Upper Right, Mid Right, and Lower Right positions of the grid 210. The value(s) of the first design variable 230 on which these additional design variations 212 are based may be higher than the value(s) on which the design variables 212 previously located in the Upper Right, Mid Right, and Lower Right positions were based.

In yet another example, selection of the Upper Right design variation 212 may cause the interface 200 to shift the design variations 212 previously located in the Upper Left, Mid Left, Lower Left, Lower Mid, and Lower Right positions out of the grid 210 such that these design variations are no longer displayed to the user. Additional design variations 212 may then be displayed in the Upper Left, Upper Mid, Upper Right, Mid Right, and Lower Right positions of the grid 210. The values of the first design variable 230 and/or second design variable 230, 232 on which these additional design variations 212 are based may be higher than the values on which the design variables 212 previously located in the Upper Left, Upper Mid, Upper Right, Mid Right, and Lower Right positions were based.

Although the examples provided above describe selecting design variations 212 to increase the values associated with the first design variable 230 and/or the second design variable 232, design variations 212 may be selected to decrease the value(s) associated with one or both of the design variables 230, 232 as well. For example, a user may select the Upper Left design variation 212 in order to decrease the value(s) of the first design variable 230 and increase the value(s) of the second design variable 232 for which additional design variations 212 are generated. In another example, a user may select the Lower Left design variation 212 in order to decrease the value(s) of the first design variable 230 and the second design variable 232 for which additional design variations 212 are generated.

Thus, to affect only the first design variable 230, and leave the second design variable 232 unchanged, the user may select a design variation 212 to the right or to the left of the current design 214. Similarly, to affect only the second design variable 232, and leave the first design variable 230 unchanged, the user may select a design variation 212 above or below the current design 214. Additionally, to affect both the first design variable 230 and the second design variable 232, the user may select a design variation 212 at one of the corners of the grid 210.

In addition to (or instead of) selecting one or more design variations 212 to modify a design variable 230, 232, the values of the design variables 230, 232 may be incremented using an application command. For example, a user may use an input device to increase or decrease a value by selecting a button on the interface 200 or by inputting a specific starting value for a design variable 230, 232 with a keyboard.

A scale selector 270 further enables the user to specify the degree to which the first design variable 230 and/or the second design variable 232 are varied between design variations 212 displayed in adjacent cells of the grid 210. As an example, the user may operate the scale selector 270 to select coarser design variations 212. In response, the parametric selection engine 124 may increase the magnitude by which a design variable 230, 232 is varied between design variations 212 displayed in adjacent cells. For example, if a design variable 230, 232 was originally varied by a magnitude of 4 units between adjacent cells, selecting coarser design variations 212 may result in the design variable 230, 232 varying by a magnitude of 6 units between adjacent cells. In another example, if a design variable 230, 232 was originally varied by a magnitude of 4 units between adjacent cells, selecting finer design variations 212 may result in the design variable 230, 232 varying by a magnitude of 2 units between adjacent cells. Thus, the scale selector 270 enables the user to control the degree to which design variables 230, 232 are varied between adjacent cells, enabling the interface 200 to be adapted to a wide variety of uses.

Figure 2B:
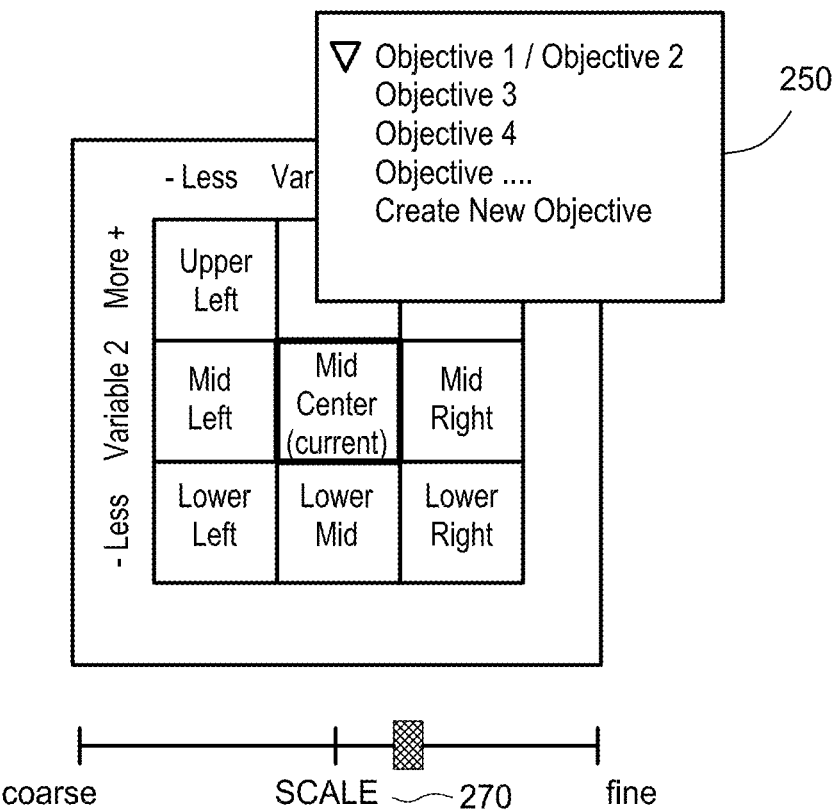
FIGS. 2B-2D illustrate a design objective selection menu and a variable selection menu included in the interface of FIG. 2A, according to one embodiment of the present invention.
Figure 2C:
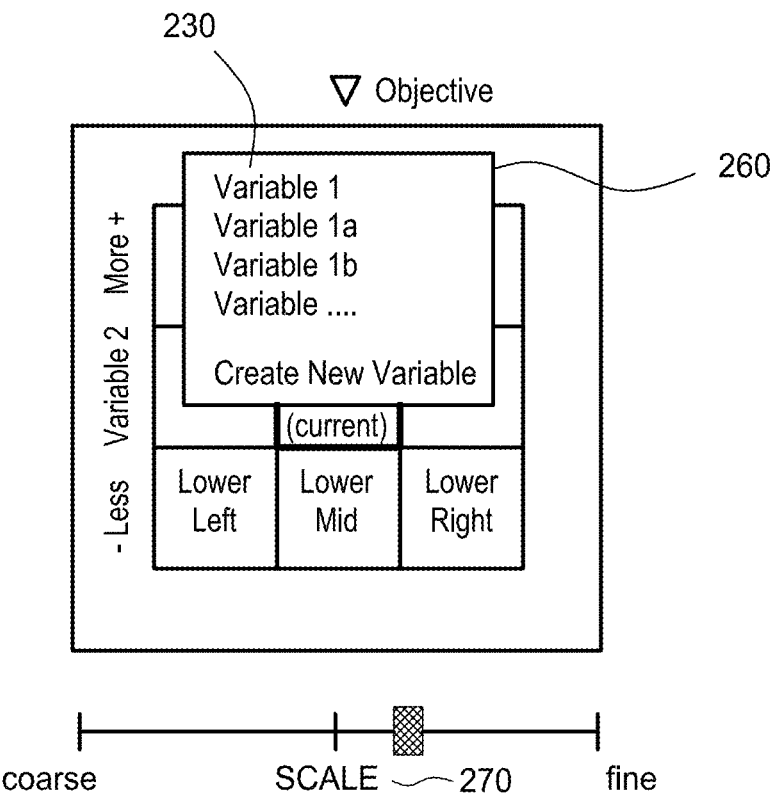
Figure 2D:
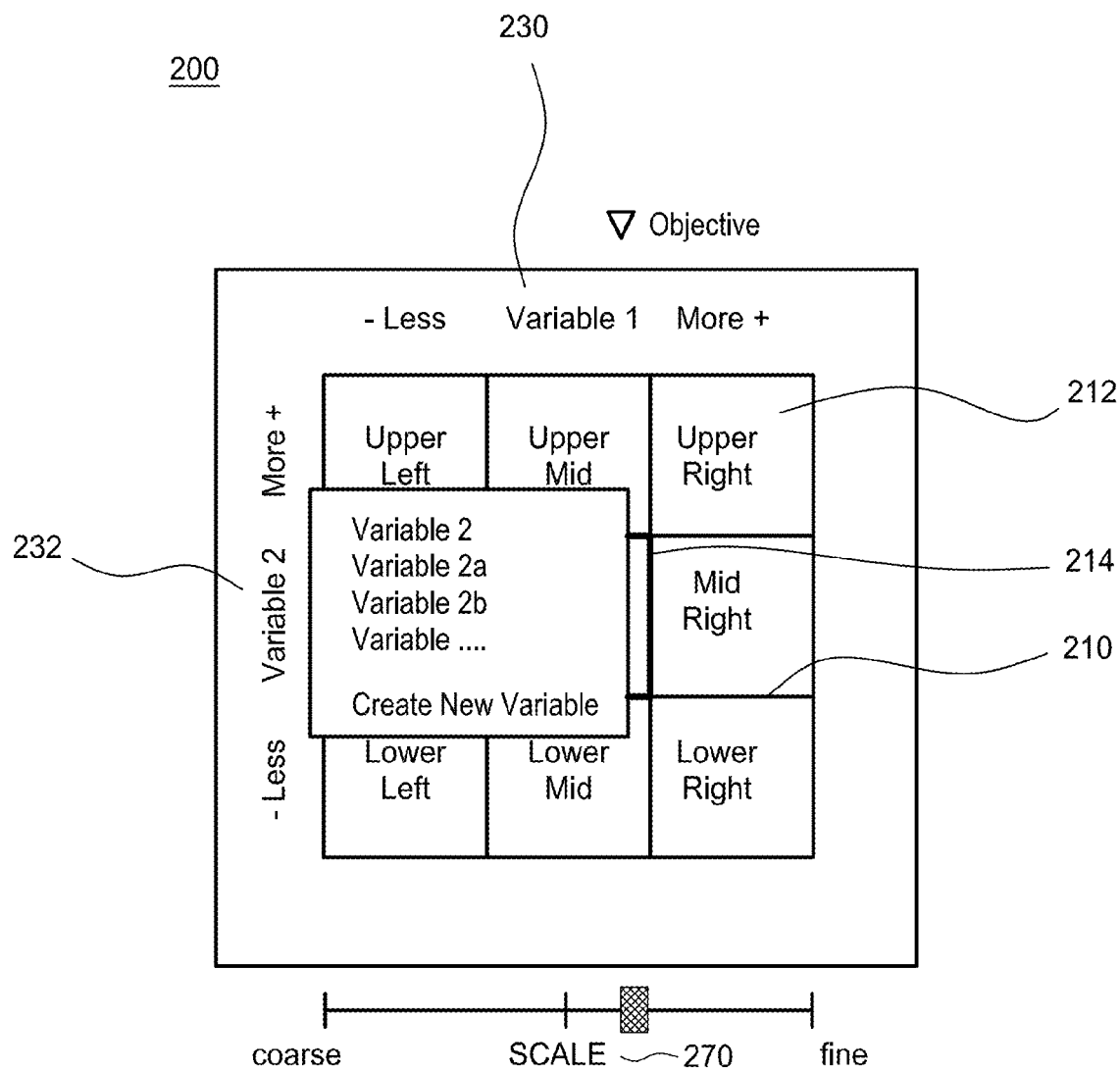

FIGS. 2B-2D illustrate a design objective selection menu 250 and a variable selection menu 260 included in the interface 200 of FIG. 2A, according to one embodiment of the present invention. The design objective selection menu 250 may include a listing of design objectives (e.g., design objective 220). The variable selection menu 260 may include a listing of design variables (e.g., design variable 230).

The objective selection menu 250 may include a dropdown menu, enabling a user to select one or more design objectives on which the design variations 212 generated by the parametric selection engine 124 will be based. Each design objective may be associated with one or more design variables. For example, a 'dimensions' design objective may include design variables such as length, width, height, volume, surface area, etc., and a 'viewpoint' objective may include design variables such as rotate camera left/right, pan camera left/right, rotate camera up/down, pan camera up/down, etc. As such, once a user selects a 'dimensions' design objective, the variable selection menu(s) may be populated with a listing of design variables, such as the design variables described above. Upon selecting a particular design objective 220, the most relevant design variables 230, 232 may be automatically selected, and design variations 212 based on the selected design variables 230, 232 may be automatically generated and displayed to the user.

The user may choose to define a new design objective and/or design variable. For example, upon choosing to define a new design objective and/or design variable, the user may be presented with a dialog box with which one or more application variables, constraints, commands, properties, etc. may be selected. The parametric selection engine 124 may then generate design variations 212 based on the design objective and/or design variable(s) defined by the user.

Figure 2E:
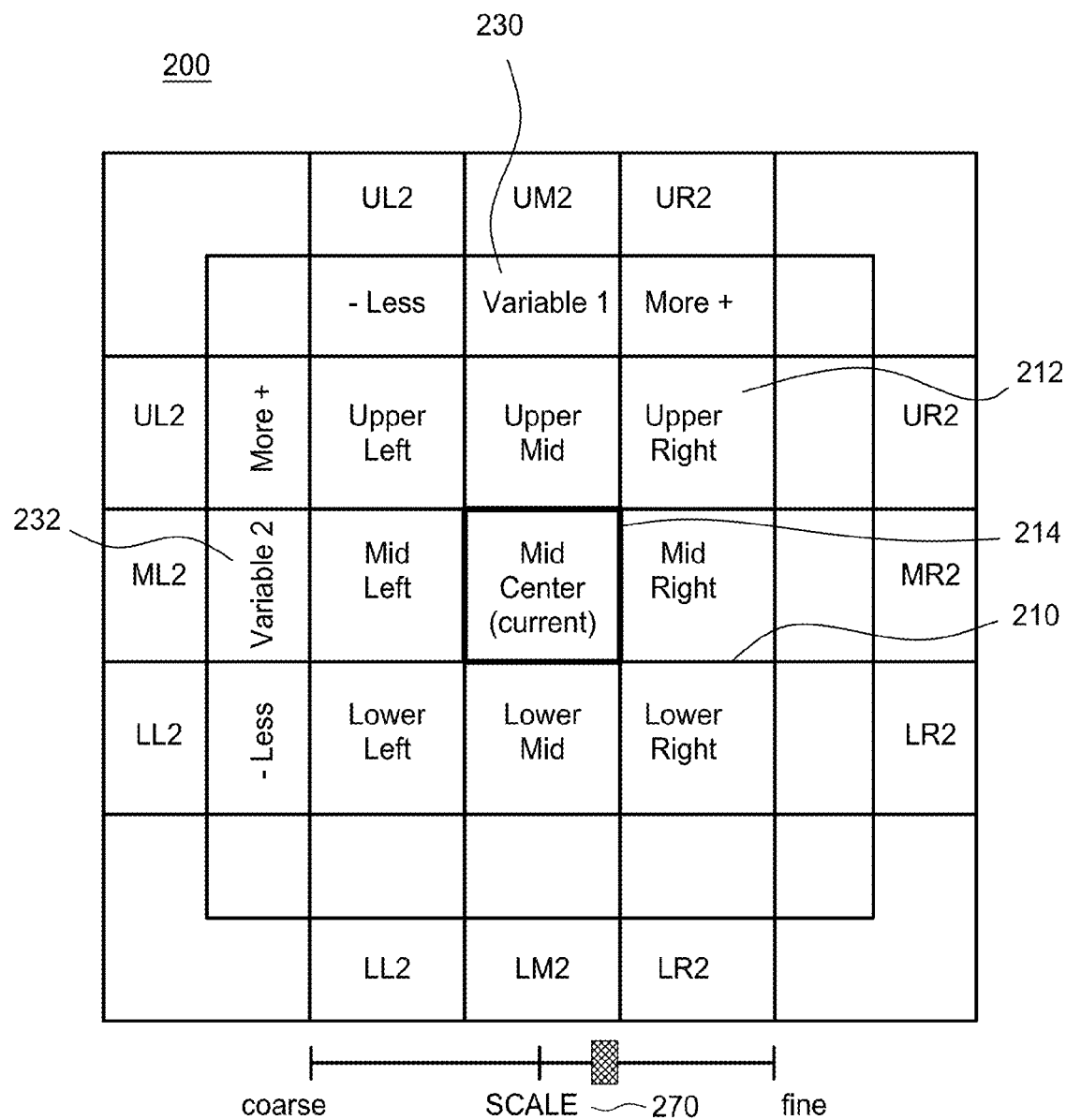
FIG. 2E illustrates pre-calculation of design variations in the interface of FIG. 2A, according to one embodiment of the present invention.

FIG. 2E illustrates pre-calculation of design variations in the interface of FIG. 2A, according to one embodiment of the present invention. Performance of the interface 200 may be improved by pre-calculating design variations based on the first design variable 230 and/or second design variable 232. Thus, once a user increments a design variable 230, 232 to generate additional design variations 212 (e.g., by selecting a design variation 212 or using an application command), the grid 210 may display additional design variations 212 with reduced latency.

For example, selection of the Mid Right design variation 212 may cause the interface 200 to shift the Mid Right design variation 212 to the current design variation 214 position. During this transition, the Upper Right 2 (UR2), Mid Right 2 (MR2), and Lower Right 2 (LR2) design variations 212 (i.e., the pre-calculated design variations 212) may shift into the Upper Right, Mid Right, and Lower Right positions, respectively. Further, the parametric selection engine 124 may then pre-calculate additional Upper Right 2, Mid Right 2, and Lower Right 2 design variations 212.

Figure 3:
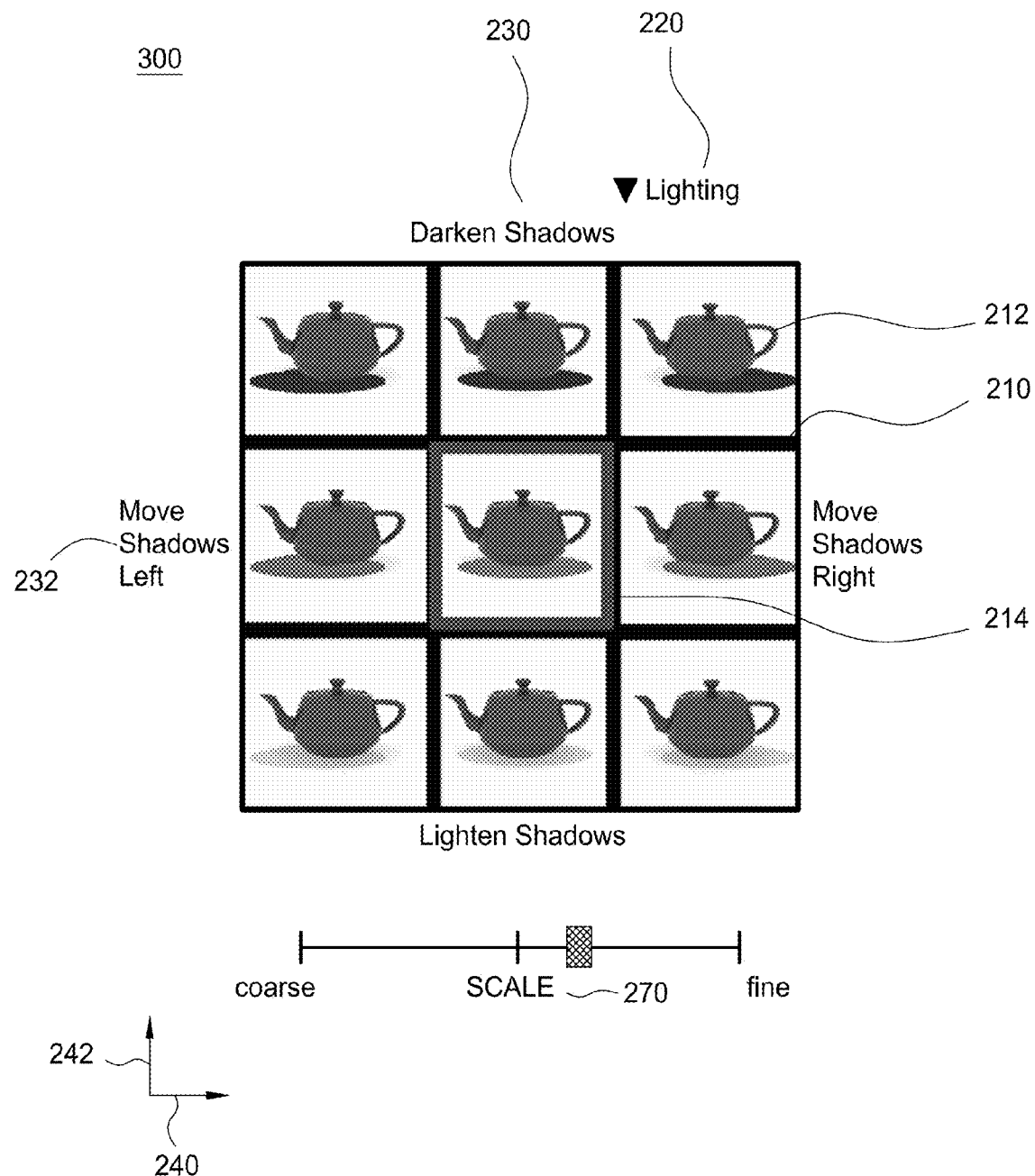
FIG. 3 illustrates design variations generated based on a lighting brightness design objective, according to one embodiment of the present invention.

FIG. 3 illustrates design variations 212 generated based on a lighting brightness design objective 220, according to one embodiment of the present invention. As shown, a user may interact with the interface 300 to select a lighting design objective 220. The user may then be presented with the option to select one or more design variables 230, 232 associated with the design objectives 220. For example, the user may choose to display design variations 212 in which the shadow direction is moved to the right and to the left with respect to the shadow direction of a current design 214. In response, the parametric selection engine 124 may modify one or more values associated with shadow direction and generate design variations 212 based on the modified values. In one example, the parametric selection engine 124 may modify a value associated with the position of a light source in order to vary the shadow direction. In another example, the parametric selection engine 124 may modify a value associated with the position of a design object (e.g., the teapot) in order to vary the shadow direction. The design variations 212 generated by the parametric selection engine 124 then may be displayed to the user such that the shadow direction associated with each design variation 212 varies along the first grid axis 240.

Additionally, the parametric selection engine 124 may modify one or more values associated with shadow brightness and generate design variations 212 based on the modified values. For example, the parametric selection engine 124 may modify a value associated with the intensity of a light source in order to vary the shadow brightness. In another example, the parametric selection engine 124 may modify a value associated with the ambient brightness in order to vary the shadow brightness. The design variations 212 generated by the parametric selection engine 124 then may be displayed to the user such that the shadow brightness associated with each design variation 212 varies along the second grid axis 242.

Figure 4A:
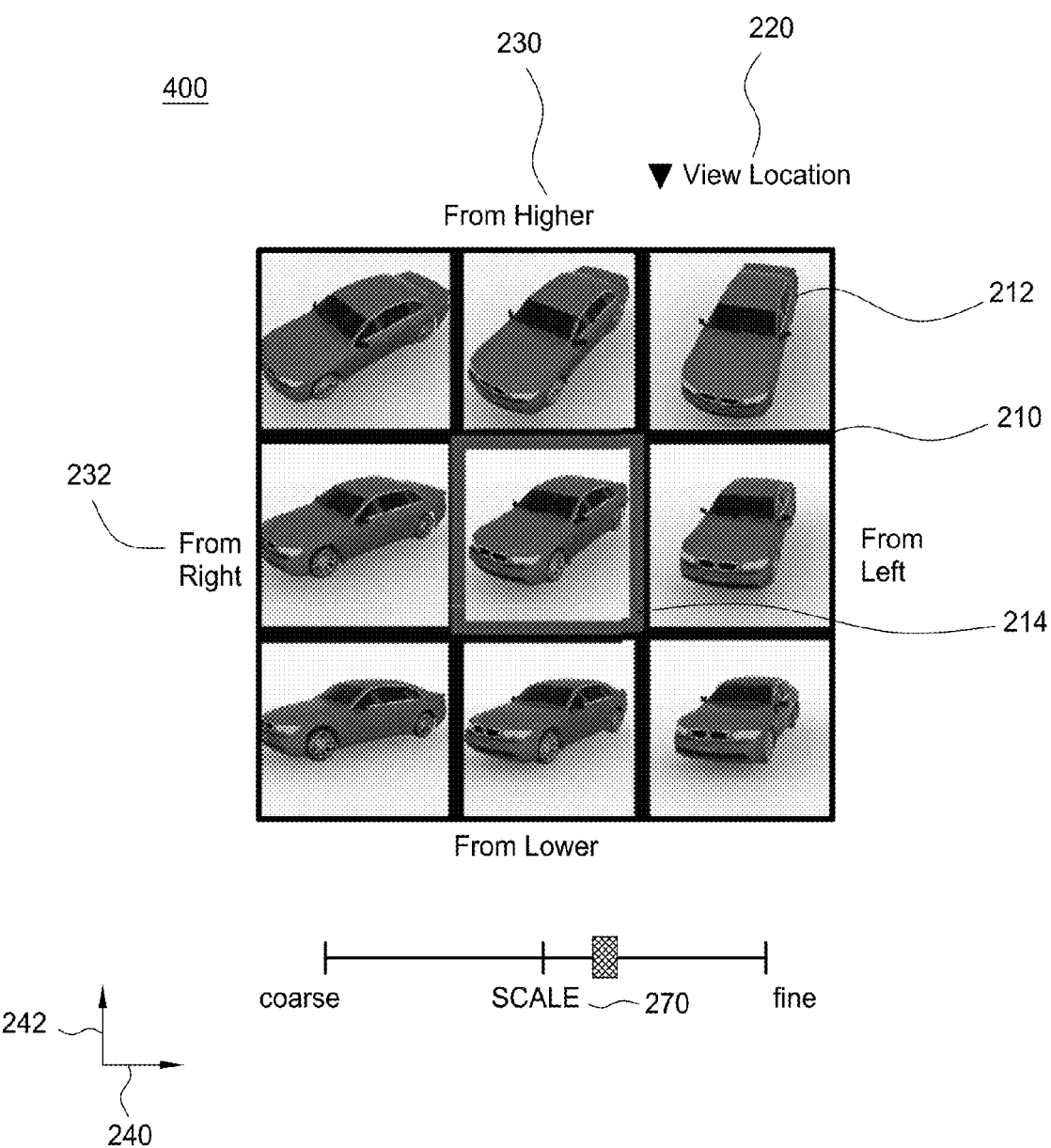
FIGS. 4A and 4B illustrate design variations generated based on a view location design objective, according to one embodiment of the present invention.
Figure 4B:
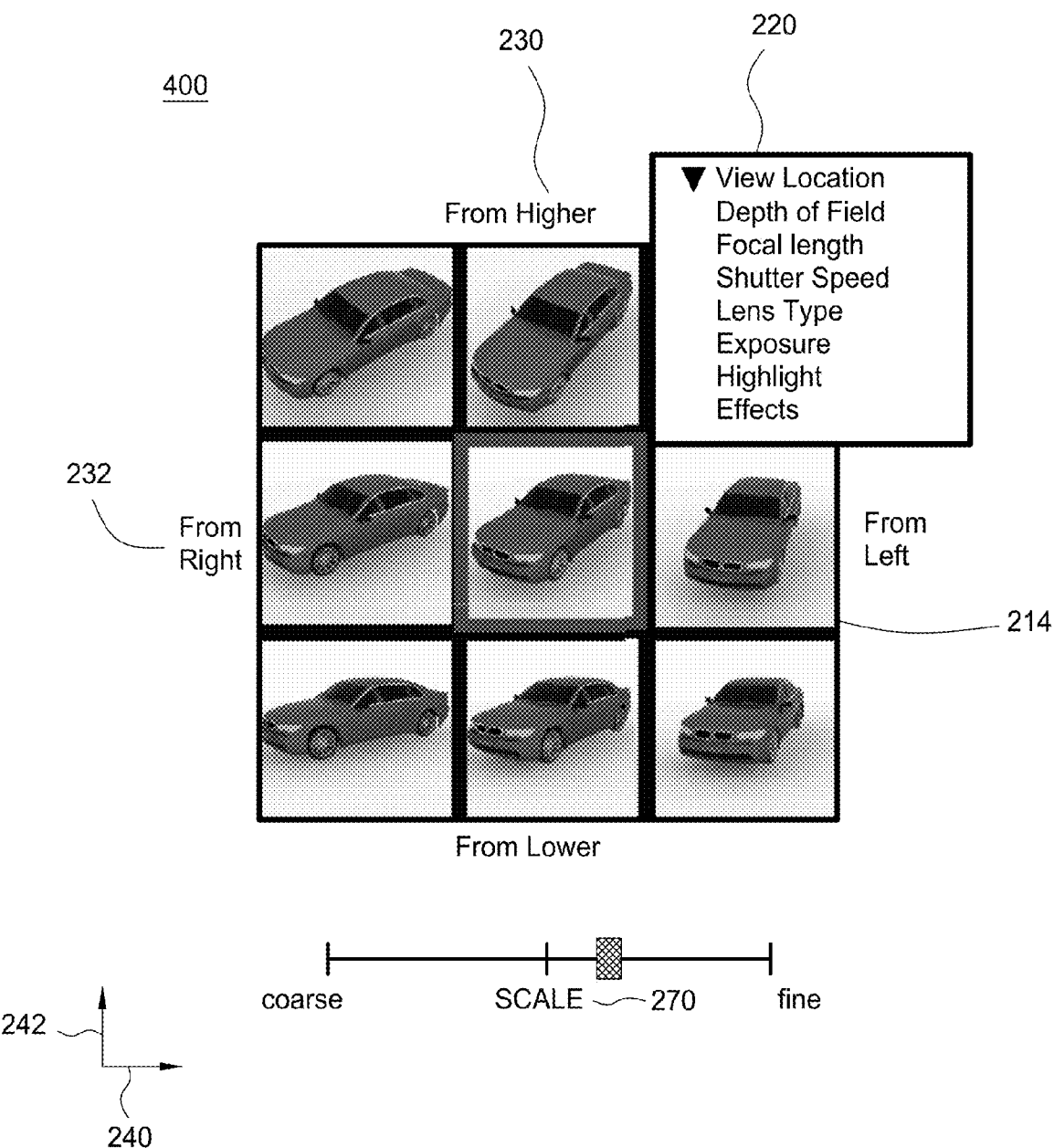

FIGS. 4A and 4B illustrate design variations 212 generated based on a view location design objective 220, according to one embodiment of the present invention. As shown, a user may interact with the interface 400 to select a single design objective 220 with which both design variables 230, 232 are associated. In FIG. 4A, a view location design objective 220 is selected. In addition, a higher/lower design variable 230 and a right/left design variable 232 are selected. Based on these design objective 220 and design variable 230, 232 selections, the parametric selection engine 124 may modify one or more values associated with a viewpoint (e.g., a camera viewpoint) and generate design variations 212 based on the modified values. In one example, the parametric selection engine 124 may modify one or more values associated with the location (e.g., height) and orientation (e.g., angle) of a camera in order to vary the view location. In another example, the parametric selection engine 124 may modify the location and orientation of one or more objects in the design in order to vary the view location. The design variations 212 generated by the parametric selection engine 124 may then be displayed to the user such that the view location associated with each design variation 212 varies along the first grid axis 240 and second grid axis 242, as shown in FIGS. 4A and 4B. As shown in FIG. 4B, other design objectives 220 may be selected, including depth of field, focal length, shutter speed, lens type, exposure, highlight, and effects design objectives 220.

As shown in FIGS. 4A and 4B, a scale selector 270 may be used to specify the degree to which the design variables 230, 232 are varied between adjacent grid 210 cells. For example, with respect to design variable 232, moving the scale selector 270 towards the fine setting may result in the design variable 232 varying by a magnitude of 5 degrees between adjacent cells, while moving the scale selector 270 towards the coarse setting may result in the design variable 232 varying by a magnitude of 15 degrees between adjacent cells.

Figure 5:
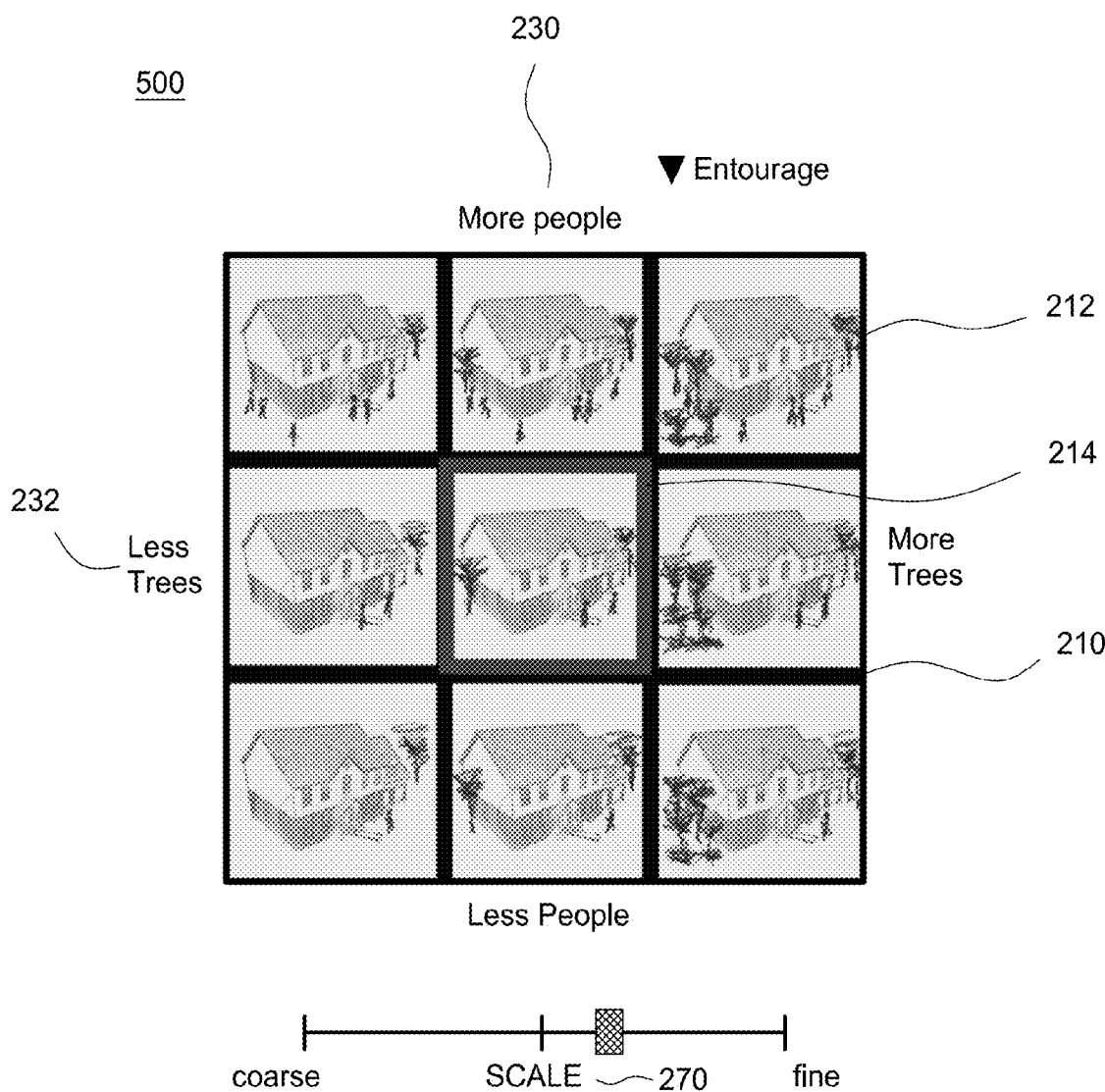
FIG. 5 illustrates design variations generated based on an entourage design objective, according to one embodiment of the present invention.

FIG. 5 illustrates design variations 212 generated based on an entourage design objective 220, according to one embodiment of the present invention. As shown, a user may interact with the interface 500 to select a number of people design variable 230 and a number of trees design variable 232. The parametric selection engine 124 may then modify a value associated with a number of objects (e.g., people and trees) included in the design and generate design variations 212 based on the modified values.

The parametric selection engine 124 may further determine how to distribute the objects within the design. For example, the objects may be pseudorandomly distributed within the design or uniformly distributed within the design. The design variations 212 may be displayed to the user such that the number of people design variable 230 associated with each design variation 212 varies along the first grid axis 240, and the number of trees design variable 232 associated with each design variation 212 varies along the second grid axis 242.

Moreover, once a user is satisfied with the number of objects (e.g., trees and people) included in the design, the user may select a new design variable from the design variable menu 260 (or a new design objective 220 from the design objective menu 250), such as an object placement uniformity design variable 230. In response to the selection of the object placement uniformity design variable 230, the parametric selection engine 124 may generate additional design variations 212 based on the number of objects included in the current design 214, where the additional design variations 212 have varying object placement uniformities. The design variations 212 may then be displayed to the user such that, for example, the degree to which objects are uniformly distributed within the design varies along the first grid axis 240.

Additionally, the parametric selection engine 124 may generate design variations 212 based on design objectives 220 and design variables 230, 232 that the user did not request. For example, the parametric selection engine 124 may generate design variations 212 based on alternate camera views, texture mapping parameters, materials choices, lighting conditions, environmental backgrounds, entourage, pre-computed animation paths, and the like.

Figure 6:
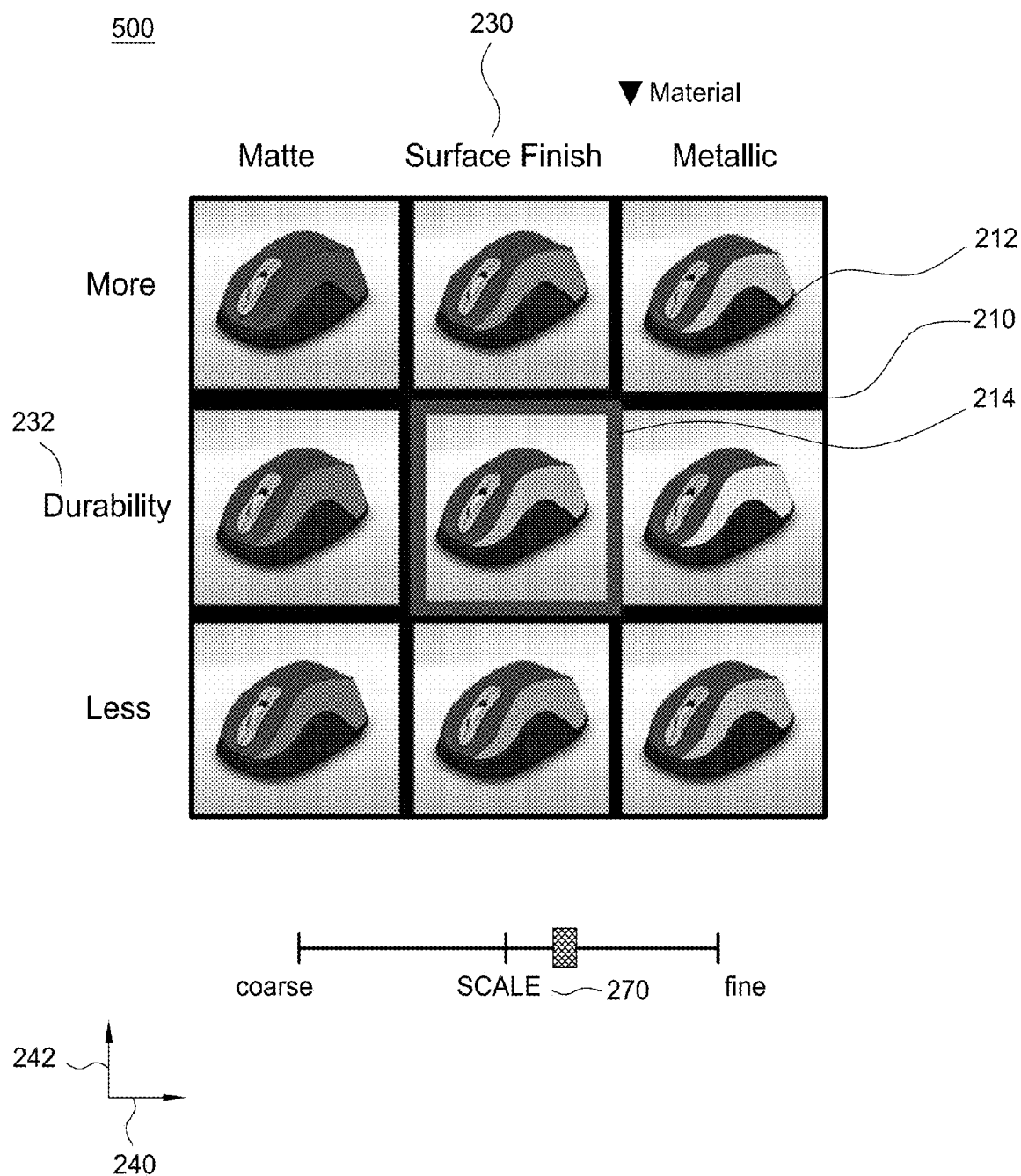
FIG. 6 illustrates design variations generated based on non-geometric design variables, according to one embodiment of the present invention.

FIG. 6 illustrates design variations 212 generated based on a material design objective 220 and non-geometric design variables (i.e., a surface finish design variable 230 and a durability design variable 232), according to one embodiment of the present invention. As shown, a user may interact with the interface 600 to select a surface finish design variable 230 and a durability design variable 232. The parametric selection engine 124 may then modify one or more values associated with design material properties and generate design variations 212 based on the modified values. Thus, as shown in FIG. 6, a user may interact with the interface 500 to select design variables (e.g., design variables 230, 232) with or without selecting a design objective 220.

In various embodiments, the parametric selection engine 124 may generate design variations 212 based on non-geometric design variables. For example, the parametric selection engine 124 may modify a value associated with the composition of a material, such as the elements included in the material, the mass fraction of a particular element in the material, a processing condition associated with the material, and the like. As shown in FIG. 6, the parametric selection engine 124 may modify a material composition value which affects the durability and/or surface finish of a material. The generated design variations 212 may then be displayed to the user such that the surface finish design variable 230 associated with each design variation 212 varies along the first grid axis 240, and the durability design variable 232 associated with each design variation 212 varies along the second grid axis 242.

Thus, the design variables 230, 232 may have an indirect correlation to the value(s) modified by the parametric selection engine 124 to generate the design variations 212. In one embodiment, the design variables 230, 232 may be a function of a mathematical equation that includes the value(s) modified by the parametric selection engine 124 to generate design variations 212. For example, with reference to FIG. 6, durability may be a function of composition and/or processing values that are modified by the parametric selection engine 124. In another embodiment, when generating the design variations 212, the parametric selection engine 124 may select one or more values based on empirical data associated with the one or more values. In yet another embodiment, the one or more values used by the parametric selection engine 124 to generate design variations 212 may be determined using mathematical simulation, mathematical optimization, geometric form finding, search heuristics, genetic algorithms, etc.

Additional examples in which the design variables 230, 232 may have an indirect correlation to one or more values modified by the parametric selection engine 124 are illustrated in FIGS. 7-9C, discussed below.

Figure 7:
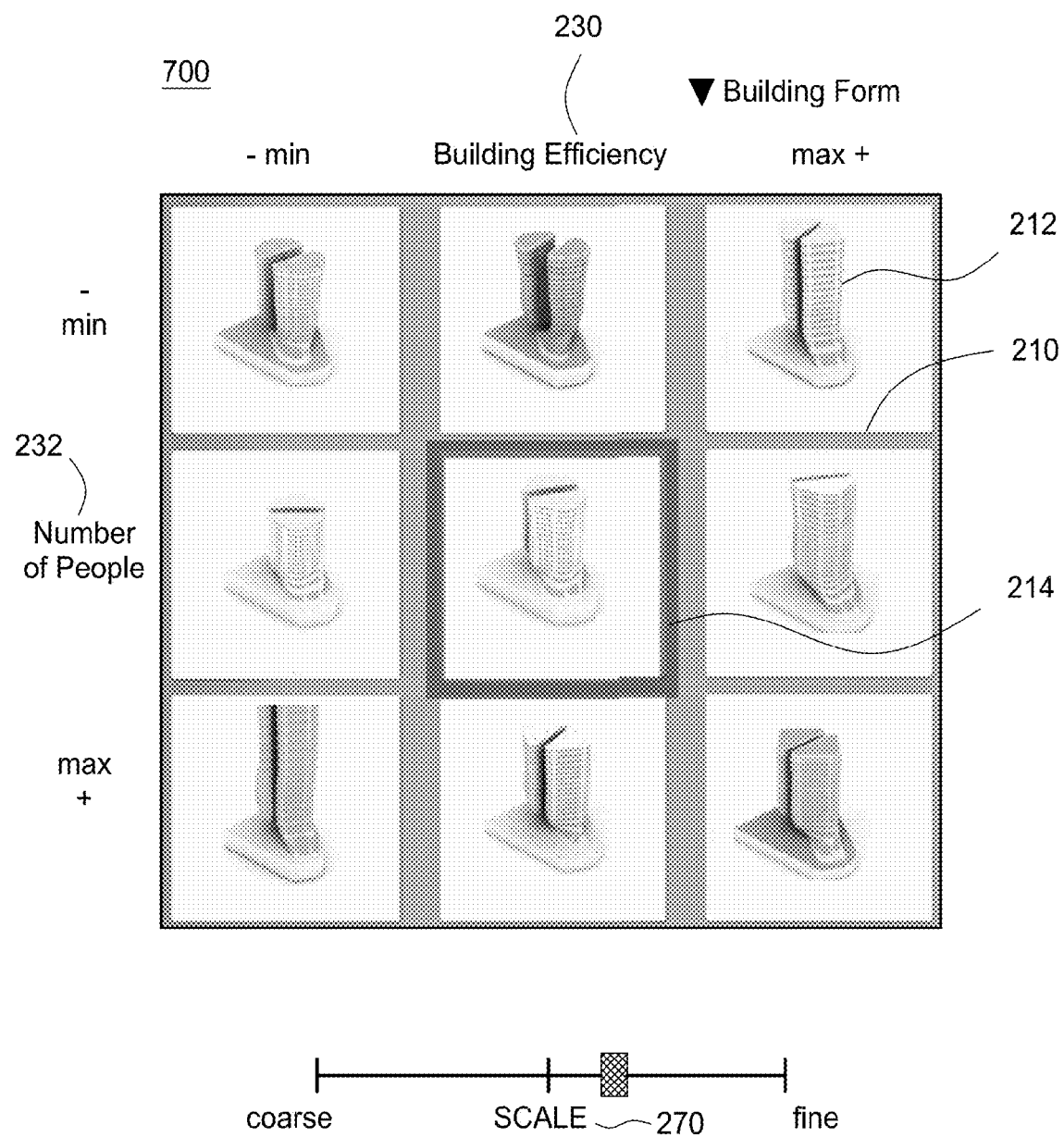
FIG. 7 illustrates design variations generated based on a building form design objective, a building efficiency design variable, and a number of people design variable, according to one embodiment of the present invention.

FIG. 7 illustrates design variations 212 generated based on a building form design objective 220, a building efficiency design variable 230, and a number of people design variable 232, according to one embodiment of the present invention. As discussed above with respect to FIG. 6, the design variables 230, 232 may have an indirect correlation to the value(s) modified by the parametric selection engine 124 and used to generate design variations 212. In FIG. 7, the building efficiency design variable 230 and the number of people design variable 232 may be a function of one or more values that are modified by the parametric selection engine 124. For example, building efficiency may be a function of values such as window size, building shape, building height, energy absorption or generation, physical orientation, material properties, etc., and the number of people may be a function of values such as building height, building footprint, number of floors, floor size, etc. Further, the values with which design variations 212 are generated may be chosen in order to optimize one or both of the design variables 230, 232, for example, by using computational design techniques (e.g., geometric form-finding). Thus, the parametric selection engine 124 may modify any number of values associated with a particular design variable when generating design variations 212. Other design variables 230, 232 that may be associated with the building form design objective 220 include glazing type, thermal efficiency, site orientation, and the like.

Figure 8:
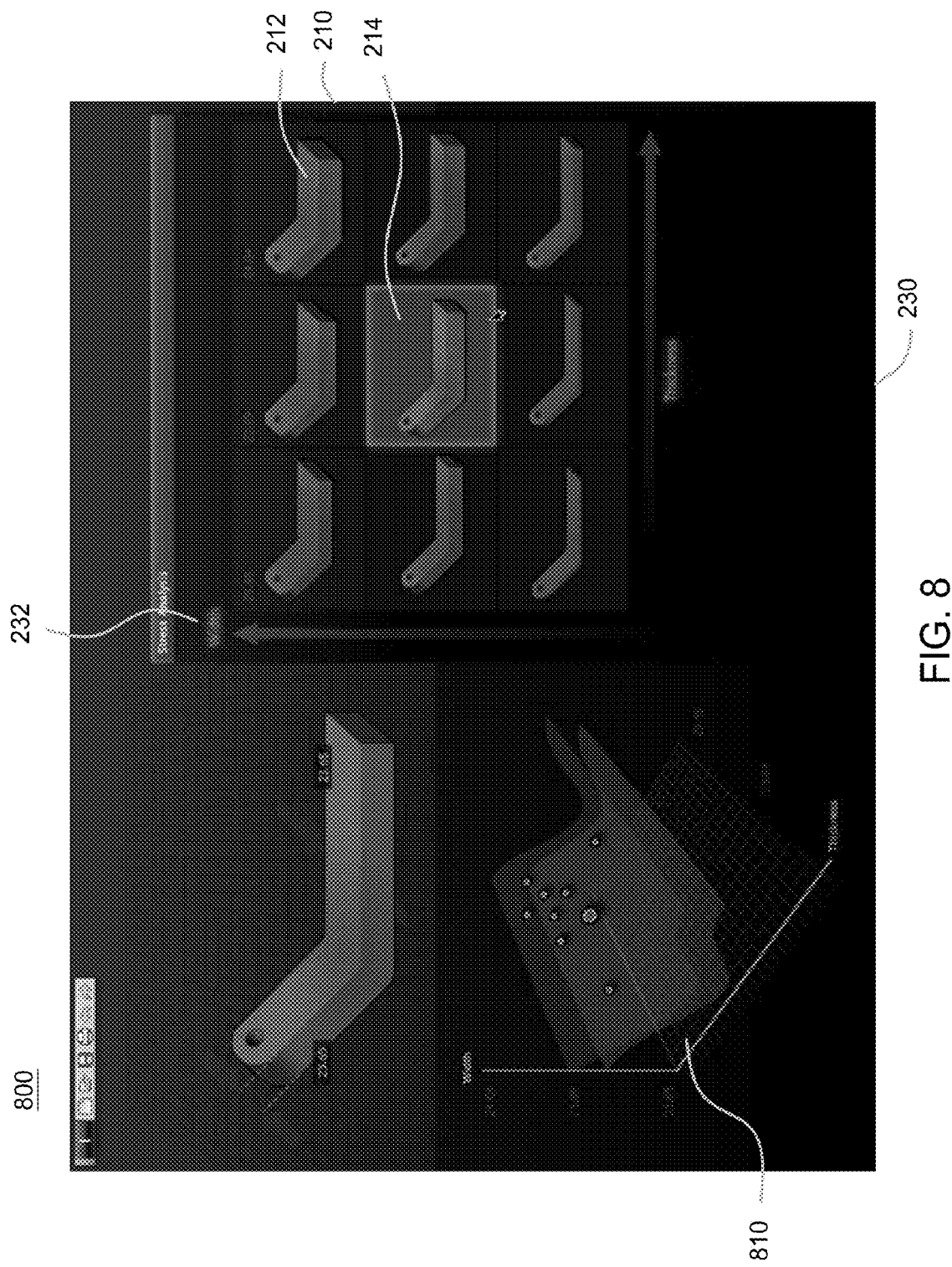
FIG. 8 illustrates design variations generated based on a mathematical simulation and optimization technique, according to one embodiment of the present invention.

FIG. 8 illustrates design variations 212 generated based on a mathematical simulation and optimization technique, according to one embodiment of the present invention. As shown, a graph 810 is provided for visualizing, on a three-dimensional surface plot, the stress experienced by a plurality of angle bracket design variations 212. The graph 810 includes a lower (blue) plane which represents the minimum allowable stress experienced by the angle bracket and an upper (red) plane which represents the maximum allowable stress experienced by the angle bracket. The highlighted green dot represents the current design 214 (e.g., a design variation 212 having an optimal thickness and width).

A design attribute associated with a first design variable 230 (e.g., a thickness design variable) and/or a second design variable 232 (e.g., a width design variable) may be determined for one or more of the design variations 212. Additionally, the design attribute may be displayed in association with the one or more design variations 212. The interface 800 may display a stress design attribute (i.e., a level of stress resulting from applying forces to the angle bracket design) for each design variation 212, where red represents a high level of stress, blue represents a moderate level of stress, and green represents a low level of stress. The design attribute may be overlayed on the design variations 212 in order to provide information associated with specific areas or locations of the design variations 212. For example, as shown in the interface 800, the stress experienced by the angle bracket design increases as the thickness and width of the design is decreased. Moreover, the interface 800 illustrates the location(s) at which stress levels are highest and lowest. Thus, by overlaying one or more design attributes on the design variations 212, the user is able to achieve one or more design objectives without needing to understand how to modify complex application variables.

Figure 9A:
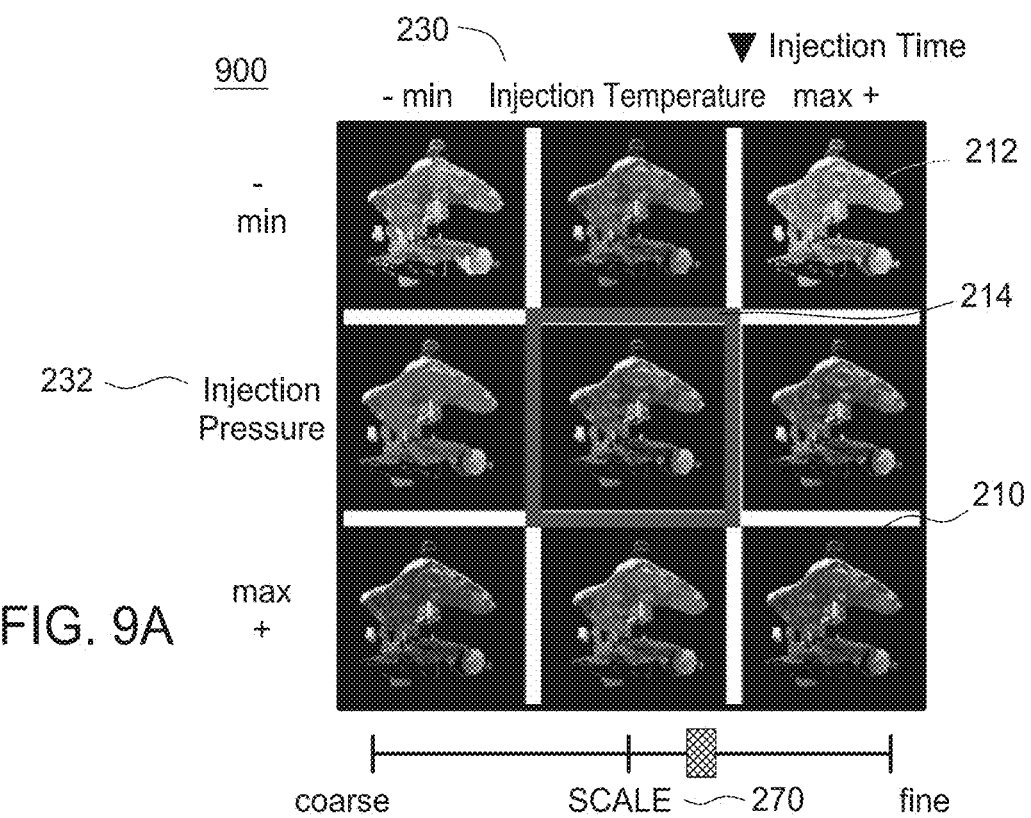
FIGS. 9A-9C illustrate the interactive resizing of a grid of design variations, according to one embodiment of the present invention.
Figure 9B:
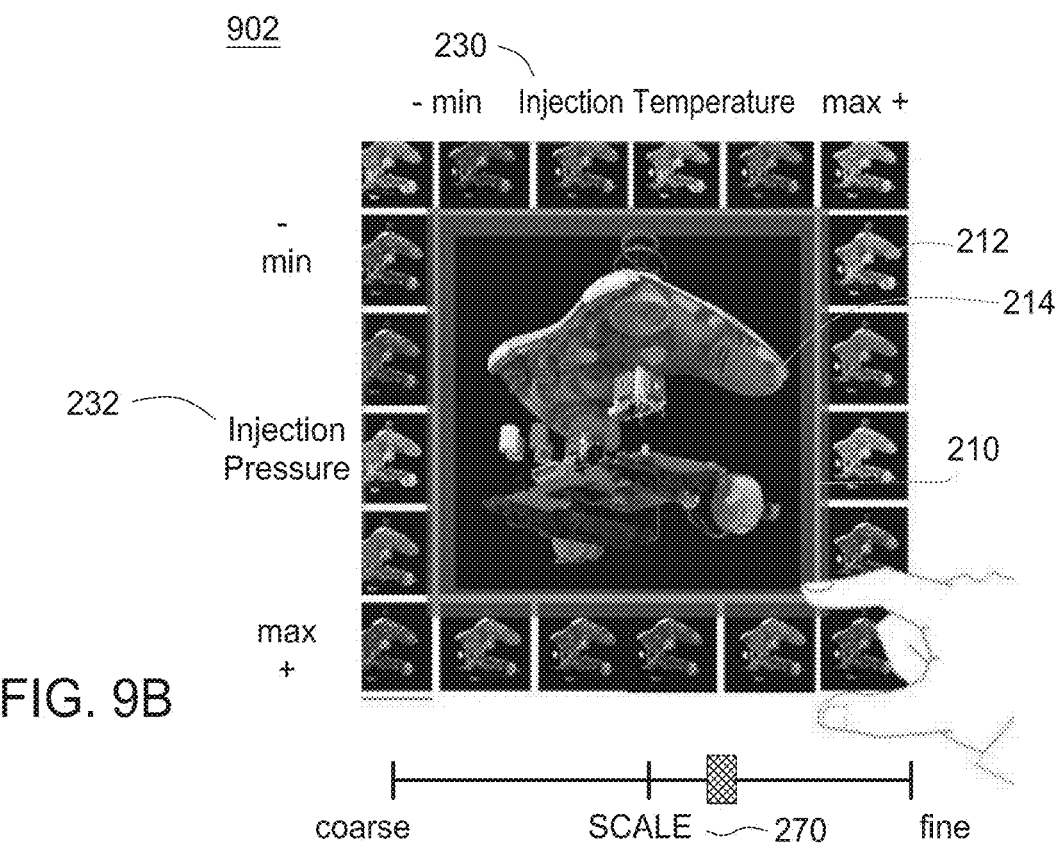
Figure 9C:
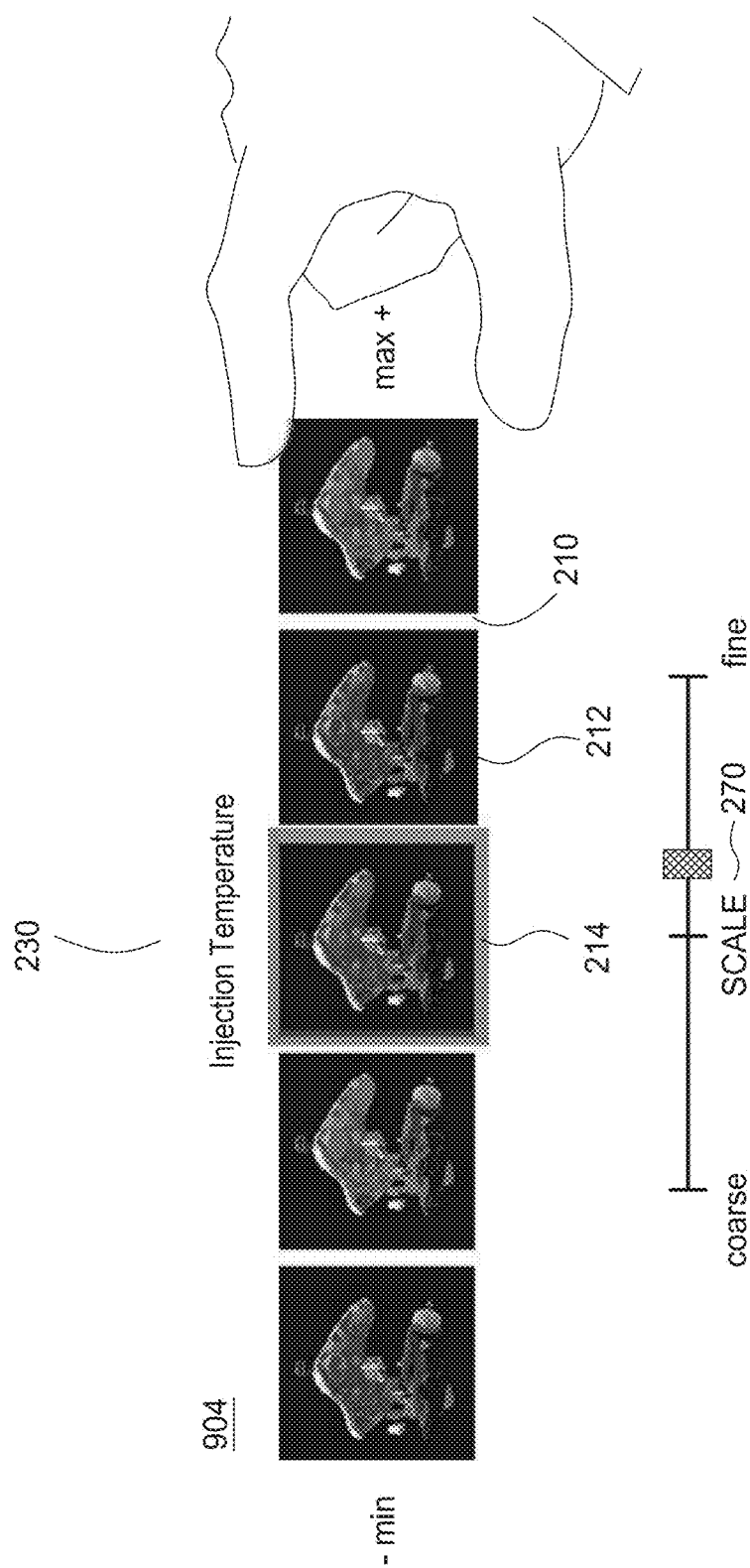

FIGS. 9A-9C illustrate the interactive resizing of a grid of design variations, according to one embodiment of the present invention. As shown, the dimensions of the grid 210 may be configured by the user to generate a larger number or smaller number of design variations 212. Additionally, the dimensions of the grid 210 may be modified to generate a larger number or smaller number of design variations 212 with respect to a particular design variable 230, 232. For example, in FIG. 9B, the grid 210 has been resized to generate a larger number of design variations 212 based on both the injection temperature design variable 230 and the injection pressure design variable 232. Further, in FIG. 9C, the grid 210 has been resized to generate a smaller number of design variations 212 (e.g., zero design variations) based on the injection pressure design variable 232. Although specific grid 210 dimensions are shown in FIGS. 9A-9C, the grid 210 may be resized to any usable dimensions.

Figure 10:
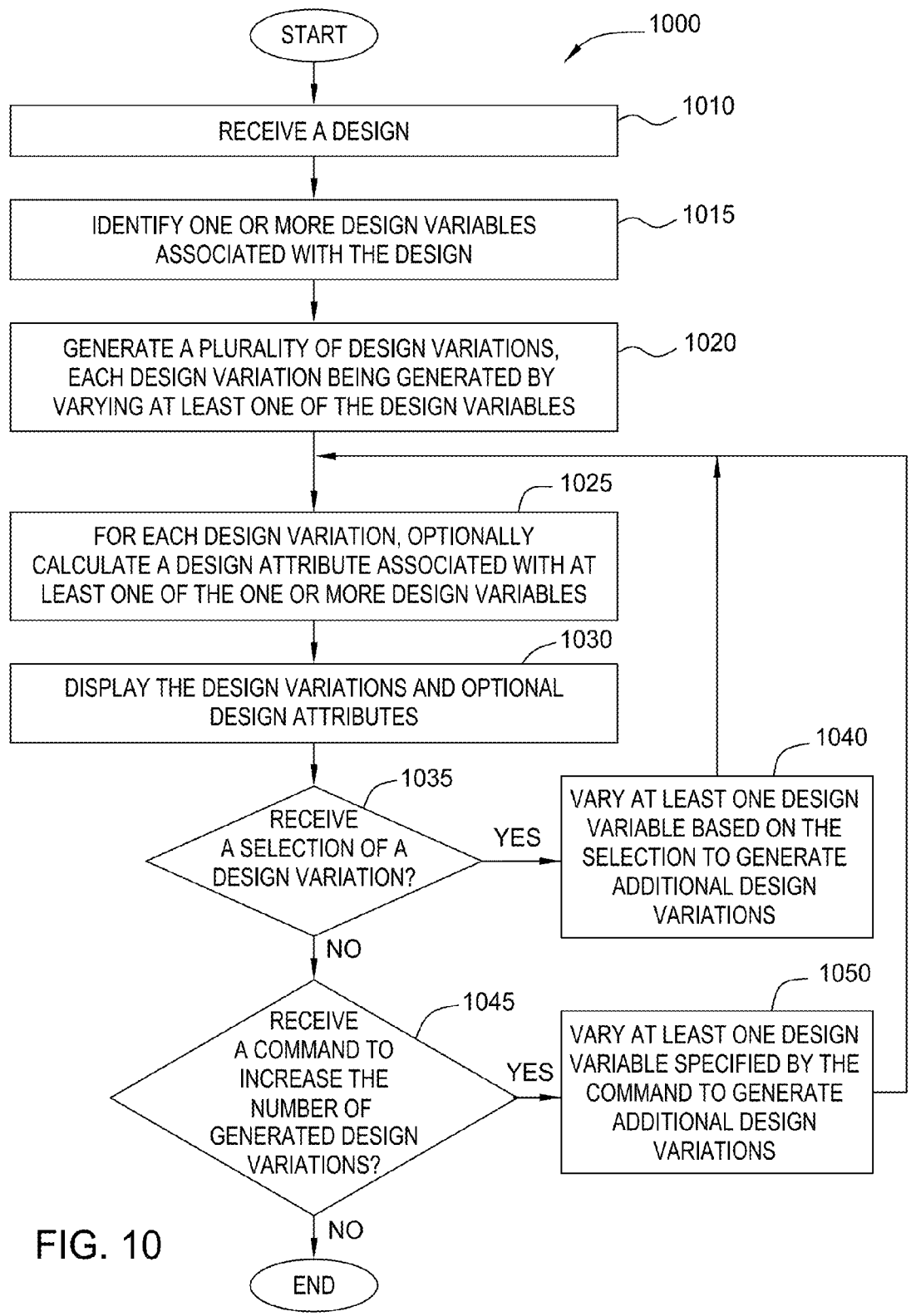
FIG. 10 is a flow diagram of method steps for generating design variations, according to one embodiment of the present invention.

FIG. 10 is a flow diagram of method steps for generating design variations 212, according to one embodiment of the present invention. Although the method steps are described in conjunction with the systems of FIGS. 1-9C, persons skilled in the art will understand that any system configured to perform the method steps, in any order, falls within the scope of the present invention.

As shown, a method 1000 begins at step 1010, where a 2D/3D design 122 is received by the parametric selection engine 124. At step 1015, one or more design variables (e.g., a first design variable 230 and a second design variable 232) associated with the design 122 are identified. At step 1020, a plurality of design variations 212 are generated by varying the one or more design variables. Each design variation 212 may be generated by assigning a different combination of values to the one or more design variables.

As described above, the parametric selection engine 124 may vary the one or more design variables by modifying one or more values that are directly correlated to the design variables (e.g., length, width, height), and/or the parametric selection engine 124 may vary the one or more design variables by modifying one or more values that are indirectly correlated to the design variables (e.g., material durability, material brightness, thermal efficiency, occupancy). Thus, varying the one or more design variables may include varying the result of a mathematical equation by modifying equation values, selecting values from empirical data, performing mathematical optimizations, etc.

At step 1025, an optional design attribute may be determined for one or more of the design variations 212. At step 1030, the design variations 212 and (optionally) the design attribute(s) may be displayed to a user.

Next, at step 1035, if the parametric selection engine 124 receives a selection of a design variation 212, a design variable associated with the selected design variation 212 is varied to generate additional design variations 212. The additional design variations 212 and optional design attributes may then be displayed at step 1030. The additional design variations 212 may be displayed to the user while also displaying a portion of the previously-displayed design variations 212. At step 1035, the parametric selection engine 124 may additionally (or alternatively) receive an application command to increment a design variable associated with the design 122. In response, the parametric selection engine 124 may generate additional design variations 212 based on the incremented design variable.

At step 1045, if the parametric selection engine 124 receives a command to increase the number of generated design variations 212, one or more design variables may be varied at step 1050 to generate additional design variations 212. The additional design variations 212 may then be displayed to the user while also displaying a portion of the previously-displayed design variations 212.

In sum, a parametric selection engine receives a design and one or more selected design variables associated with the design. The parametric design engine then generates a plurality of design variations, each design variation being generated by modifying at least one of the selected design variables. The design variations are then displayed to a user, enabling the user to select between the different design variations. Based on the design variation(s) selected by the user, the parametric design engine may then generate additional design variations for display.

One advantage of the techniques described herein is that a user is able to select one or more design variables and view multiple design variations generated by modifying those variable(s). The user is then able to select between the design variations to adjust the variable(s) and refine the design. Thus, the user, whether novice or expert, is able to preview the impact of one or more design variables on the overall quality of the design image. The disclosed technique, among other things, enables users to more efficiently generate high-quality designs and meet design objectives with little or no prior knowledge of the relevant application variables and commands.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for generating design variations, the method comprising:
   receiving a first selected design objective for a design;
   selecting a first design variable and a second design variable associated with the first selected design objective;
   generating, via a processor, a first plurality of design variations based on the first selected design objective, wherein each design variation is generated by a parametric engine that varies at least one of the first design variable and the second design variable; and
   causing the first plurality of design variations to be displayed to a user,
   wherein the selecting, generating, and causing are performed automatically in response to receiving the first selected design objective.

2. The method of claim 1, wherein each design variation included in the first plurality of design variations is generated by assigning a different combination of values to the first design variable and the second design variable.

3. The method of claim 1, further comprising:
   receiving a first command to increment the first design variable;
   in response to the first command, varying the first design variable to generate a second plurality of design variations; and
   causing the second plurality of design variations to be displayed to the user.

4. The method of claim 3, wherein receiving the first command comprises receiving a selection of a design variation included in the first plurality of design variations.

5. The method of claim 3, further comprising displaying at least a portion of the first plurality of design variations while also displaying the second plurality of design variations.

6. The method of claim 3, further comprising:
   receiving a second command to increment the second design variable;
   in response to the second command, varying the second design variable to generate a third plurality of design variations; and
   causing the third plurality of design variations to be displayed to the user while also displaying at least a portion of the first plurality of design variations and at least a portion of the second plurality of design variations.

7. The method of claim 1, further comprising:
   arranging the first plurality of design variations in a grid; and
   causing the grid to be displayed to the user, wherein the first design variable varies along a first grid axis, and the second design variable varies along a second grid axis.

8. The method of claim 7, wherein the first design variable, at any point on the first grid axis, is substantially constant along the second grid axis, and the second design variable, at any point on the second grid axis, is substantially constant along the first grid axis.

9. The method of claim 7, further comprising:
   receiving a first command to increase a total number of generated design variations;
   in response to the first command, varying the first design variable to generate a second plurality of design variations; and
   causing the second plurality of design variations to be displayed to the user while also displaying the first plurality of design variations.

10. The method of claim 1, further comprising, for each design variation included in the first plurality of design variations:
    calculating a design attribute that is associated with at least one of the first design variable and the second design variable; and
    causing the design attribute to be displayed to the user while also displaying the first plurality of design variations.

11. A non-transitory computer-readable storage medium including instructions that, when executed by a processing unit, cause the processing unit to generate design variations, by performing the steps of:
  receiving a first selected design objective for a design:
  selecting a first design variable and a second design variable associated with the first selected design objective;
  generating a first plurality of design variations based on the first selected design objective, wherein each design variation is generated by a parametric engine that varies at least one of the first design variable and the second design variable; and
  causing the first plurality of design variations to be displayed to a user,
  wherein the selecting, generating, and causing are performed automatically in response to receiving the first selected design objective.

12. The non-transitory computer-readable storage medium of claim 11, wherein each design variation included in the first plurality of design variations is generated by assigning a different combination of values to the first design variable and the second design variable.

13. The non-transitory computer-readable storage medium of claim 11, further comprising:
  receiving a first command to increment the first design variable;
  in response to the first command, varying the first design variable to generate a second plurality of design variations; and
  causing the second plurality of design variations to be displayed to the user.

14. The non-transitory computer-readable storage medium of claim 13, wherein receiving the first command comprises receiving a selection of a design variation included in the first plurality of design variations.

15. The non-transitory computer-readable storage medium of claim 13, further comprising displaying at least a portion of the first plurality of design variations while also displaying the second plurality of design variations.

16. The non-transitory computer-readable storage medium of claim 13, further comprising:
  receiving a second command to increment the second design variable;
  in response to the second command, varying the second design variable to generate a third plurality of design variations; and
  causing the third plurality of design variations to be displayed to the user while also displaying at least a portion of the first plurality of design variations and at least a portion of the second plurality of design variations.

17. The non-transitory computer-readable storage medium of claim 11, further comprising:
  arranging the first plurality of design variations in a grid; and
  causing the grid to be displayed to the user, wherein the first design variable varies along a first grid axis, and the second design variable varies along a second grid axis.

18. The non-transitory computer-readable storage medium of claim 17, further comprising:
  receiving a first command to increase a total number of generated design variations;
  in response to the first command, varying the first design variable to generate a second plurality of design variations; and
  causing the second plurality of design variations to be displayed to the user while also displaying the first plurality of design variations.

19. The non-transitory computer-readable storage medium of claim 10, further comprising, for each design variation included in the first plurality of design variations:
  calculating a design attribute that is associated with at least one of the first design variable and the second design variable; and
  causing the design attribute to be displayed to the user while also displaying the first plurality of design variations.

20. A computing device, comprising:
  a parametric engine;
  a memory; and
  a processing unit coupled to the memory and configured to:
    receive a first selected design objective for a design:
    select a first design variable and a second design variable associated with the first selected design objective;
    generate a first plurality of design variations based on the first selected design objective, wherein each design variation is generated by the parametric engine that varies at least one of the first design variable and the second design variable; and
    cause the first plurality of design variations to be displayed to a user, wherein the selecting, generating, and causing are performed automatically in response to receiving the first selected design objective.

21. The computing device of claim 20, wherein the memory stores instructions that, when executed by the processing unit, cause the processing unit to identify, generate, and cause.

22. The method of claim 1, wherein identifying the first design variable and the second design variable comprises the parametric engine automatically identifying the first design variable and the second design variable based on the first selected design objective.

23. The method of claim 1, wherein, in response to receiving the first selected design objective, the parametric engine automatically performs the identifying, generating, and causing steps.

* * * * *